(12) United States Patent
Li et al.

(10) Patent No.: US 11,774,708 B2
(45) Date of Patent: Oct. 3, 2023

(54) LENS SYSTEM, FINGERPRINT IDENTIFICATION APPARATUS AND TERMINAL DEVICE

(71) Applicant: SHENZHEN GOODIX TECHNOLOGY CO., LTD., Shenzhen (CN)

(72) Inventors: Linxin Li, Shenzhen (CN); Wei Long, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 421 days.

(21) Appl. No.: 17/134,138

(22) Filed: Dec. 24, 2020

(65) Prior Publication Data

US 2021/0116679 A1 Apr. 22, 2021

Related U.S. Application Data

(63) Continuation of application No. PCT/CN2018/101594, filed on Aug. 21, 2018.

(51) Int. Cl.
*G02B 9/12* (2006.01)
*G02B 13/18* (2006.01)
*G06V 40/13* (2022.01)

(52) U.S. Cl.
CPC ............. *G02B 9/12* (2013.01); *G02B 13/18* (2013.01); *G06V 40/1318* (2022.01)

(58) Field of Classification Search
CPC .... G02B 9/12; G02B 13/189; G02B 27/0025; G02B 13/04; G06V 40/1318; G03B 5/00
USPC ........................................................ 359/716
See application file for complete search history.

(56) References Cited

U.S. PATENT DOCUMENTS

| 8,189,276 B1 * | 5/2012 | Hsu ................. G02B 13/04 359/716 |
| 2014/0111850 A1 | 4/2014 | Huang et al. |
| 2014/0293456 A1 | 10/2014 | Komiyama |
| 2016/0205297 A1 | 7/2016 | Chen et al. |

(Continued)

FOREIGN PATENT DOCUMENTS

| CN | 101393318 A | 3/2009 |
| CN | 102213821 A | 10/2011 |

(Continued)

OTHER PUBLICATIONS

Gross, H. et al., "Handbook of Optical Systems, vol. 3: Aberration Theory and Correction of Optical Systems", Chapter 31: Correction of Aberrations, Jan. 2007, pp. 215-221 and 225-250, published by Wiley-VCH, Weinheim, Germany.

*Primary Examiner* — Abdul-Samad A Adediran
(74) *Attorney, Agent, or Firm* — Scully, Scott, Murphy & Presser, P.C.

(57) ABSTRACT

A lens system, a fingerprint identification module and a terminal device, including a first lens, a second lens and a third lens arranged sequentially from an object side to an image side, wherein the first lens is a meniscus negative optical power lens with the object side being concave, the second lens is a positive optical power lens with both object side and image side being convex, and the third lens is a positive optical power lens with both object side and image side being convex. The parameters of the lens system follow a first relationship so that a field of view FOV of the lens system is greater than a first threshold.

15 Claims, 7 Drawing Sheets

(56) References Cited

U.S. PATENT DOCUMENTS

| | | | |
|---|---|---|---|
| 2018/0224638 A1 | 8/2018 | Uchida et al. | |
| 2019/0158750 A1* | 5/2019 | Kim | ......................... G03B 5/00 |
| 2021/0286152 A1* | 9/2021 | Jia | ...................... G02B 27/0025 |

FOREIGN PATENT DOCUMENTS

| | | |
|---|---|---|
| CN | 103777315 A | 5/2014 |
| CN | 103792646 A | 5/2014 |
| CN | 203630432 U | 6/2014 |
| CN | 105137579 A | 12/2015 |
| CN | 205176383 U | 4/2016 |
| CN | 105824108 A | 8/2016 |
| CN | 205486177 U | 8/2016 |
| CN | 206282024 U | 6/2017 |
| CN | 108254997 A | 7/2017 |
| CN | 107422795 A | 12/2017 |
| CN | 207133576 U | 3/2018 |
| CN | 108037577 A | 5/2018 |
| CN | 207529356 U | 6/2018 |
| CN | 208888461 U | 5/2019 |
| CN | 210038312 U | 2/2020 |
| JP | 2016-170446 A | 9/2016 |

\* cited by examiner

LENS SYSTEM, FINGERPRINT IDENTIFICATION APPARATUS AND TERMINAL DEVICE

CROSS-REFERENCE TO RELATED APPLICATIONS

This application is a continuation of International Application No. PCT/CN2018/101594, filed on Aug. 21, 2018, the disclosure of which is hereby incorporated by reference in its entirety.

TECHNICAL FIELD

Embodiments of the present application relate to the optical imaging field, and more specifically, relate to a lens system, a fingerprint identification apparatus and a terminal device.

BACKGROUND

With the development of fingerprint identification sensor, due to its occupying no physical space on electronic devices, an under-screen fingerprint identification technology is becoming a technical trend because it occupies no space on an electronic device. At present, the under-screen fingerprint identification technology is based on a principle of light collimating, and resolution ratio of an optical fingerprint identification module is determined by distribution period and depth-to-width ratio of a light collimating unit. If the size of the optical fingerprint identification module is limited, a resolving power of the fingerprint identification is low, which affects accuracy and security of fingerprint identification.

SUMMARY

A lens system, a fingerprint identification apparatus and a terminal device are provided in the present application, which can collect fingerprint information in a wide range when the size of the fingerprint module is limited, so as to increase a resolving power of the fingerprint identification and improve the accuracy and security of the fingerprint identification.

In a first aspect, a lens system is provided, including: a first lens, a second lens and a third lens arranged sequentially from an object side to an image side, where the first lens is a meniscus negative optical power lens with the object side being concave, the second lens is a positive optical power lens with both object side and image side being convex, and the third lens is a positive optical power lens with both object side and image side being convex. The parameters of the lens system follow a first relationship so that a field of view FOV of the lens system is greater than a first threshold, where the parameters of the lens system include at least two of the following: a focal length of the first lens, a focal length of the second lens, a focal length of the third lens, a combined focal length of the first lens and the second lens, a combined focal length of the second lens and the third lens, and a focal length of the lens system.

Therefore, the lens system according to the embodiment of the present application achieves a performance of a large FOV by arranging lenses with different optical power and by setting the parameters of the lens system to follow the first relationship, thereby improving the fingerprint identification performance of the optical fingerprint identification module which adopts the lens system.

In some possible implementation manners, the first relationship is $1.0<f_{12}/f_3<2.7$, where $f_{12}$ is the combined focal length of the first lens and the second lens, and $f_3$ is the focal length of the third lens.

In some possible implementation manners, the first threshold is 120 degrees.

In some possible implementation manners, the largest image height Y' on an imaging plane of the lens system, the focal length f, and a distance from a lower surface of a display to the imaging plane of the lens system TTL follow a second relationship so that the focal length of the lens system is less than a second threshold.

In some possible implementation manners, the second relationship is $0.4<Y'/(f*TTL)<0.5$.

In some possible implementation manners, the lens system further including: a diaphragm, arranged between the second lens and the third lens.

In some possible implementation manners, at least one surface of the lens system is an aspherical surface.

In some possible implementation manners, a TV distortion of the lens system is less than 5%, a relative illuminance of the lens system is greater than 30%, and an F-number of the lens system is less than 1.5.

Optionally, by setting at least one of radius of curvature, thickness, material, effective diameter and conic coefficient of each surface of the lens system, and/or aspheric high order terms coefficient of an aspherical lens of the lens system, such as A2, A4, A6, A8, A10, A12, A14, A16, so that the parameters of the lens system follow the first relationship and the second relationship, thereby making the FOV greater than 120 degrees, the TV distortion less than 5%, the F-number less than 1.5, and the relative illuminance greater than 30%, in the lens system.

In a second aspect, a fingerprint identification apparatus is provided, including: the lens system in the first aspect or any possible implementation manners of the first aspect.

In some possible implementation manners, the fingerprint identification apparatus further includes: an imaging sensor, disposed under the lens system, configured to receive an optical signal transmitted by the lens system, and process the optical signal so as to obtain fingerprint information in the optical signal.

In some possible implementation manners, the fingerprint identification apparatus further includes: a holder, where the lens system is assembled in the holder with an interference fit.

In a third aspect, a terminal device is provided, including: the lens system in the first aspect or any possible implementation manners of the first aspect.

In some possible implementation manners, the terminal device further includes: a screen assembly, where includes a display, a foam and a copper foil, which are disposed on the fingerprint identification apparatus of the lens system; where a corresponding area above the lens system in the foam and the copper foil is opened so that the optical signal with fingerprint information enters the lens system.

DESCRIPTION OF EMBODIMENTS

Technical solutions of the present application is hereinafter described with reference to the accompanying drawings.

It should be understood that embodiments of the present application could be applied to an optical fingerprint system, including but not limited to an optical fingerprint identification system and a medical diagnostic product based on optical fingerprint imaging. The embodiments of the present application are merely described by taking the optical fingerprint system as an example, which should not constitute any limitation to the embodiments of the present application, and the embodiments of the present application are also applicable to other systems adopting the optical imaging technology or the like.

It should also be understood that the embodiments of the present application can be not only used for the fingerprint identification but also used for other biometrics identification, such as a living body identification, to which are not limited in the embodiments of the present application.

As a commonly application scenario, the optical fingerprint system provided in the embodiments of the present application may be applied to a smart phone, a tablet computer and other mobile terminals with a display screen or other terminal devices. More specifically, in the foregoing terminal device, the fingerprint collecting apparatus may be specifically an optical fingerprint apparatus, which may be disposed in a partial region or an entire region under a display screen, thereby forming an under-display optical fingerprint system.

Figure 1:
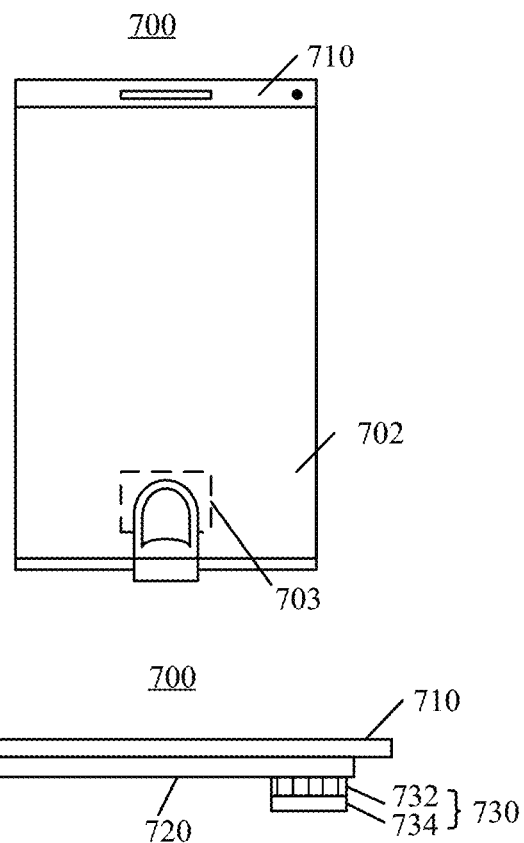
FIG. 1 is a structural schematic diagram of the terminal device applied to an embodiment of the present application.

FIG. 1 is a structural schematic diagram of a terminal device an embodiment of the present application. The terminal device 700 includes a display 720 and an optical fingerprint apparatus 730, where the optical fingerprint apparatus 730 is disposed in partial region under the display 720. The optical fingerprint apparatus 730 includes a sensing array with a plurality of optical sensing unit. A region where the sensing array is located is a fingerprint detecting region 703 of the optical fingerprint apparatus 730. As shown in FIG. 1, the fingerprint detecting region 703 is located in a display region 702 of the display screen 720. Therefore, when a user needs to unlock the terminal device or perform other fingerprint verifications, a fingerprint input may be implemented merely by pressing a finger against the fingerprint detecting region 703 located on the display screen 720. Since the fingerprint detecting can be implemented in the display screen, there is no need to exclusively reserve space for a front surface of the terminal device 700 adopting the foregoing structure to set a fingerprint button (such as a Home button).

In a preferable embodiment, the display screen 720 may adopt a display with a self-emitting display unit, for example, an organic light-emitting diode (Organic Light-Emitting Diode, OLED) display screen or a micro light-emitting LED (Micro-LED) display screen. Taking the OLED display as an example, the optical fingerprint apparatus 730 may use the display unit (that is, an OLED light source) located at the fingerprint detecting region 703 of the OLED display screen 720 as an excitation light source for optical fingerprint detection The sensing array of the optical fingerprint apparatus 730 is specifically a photo detector (Photo detector) array including a plurality of photo detectors distributed in an array. The photo detector may act as the above-mentioned optical sensor unit. When a finger is pressed against the fingerprint detecting region 703, the display unit in fingerprint detecting region 703 emits light which reflects on a fingerprint surface of a finger and form reflected light, where the reflected light on the ridges and the valleys of the fingerprint are different. The reflected light emitted from the display 720 is received by the photo detector array and transformed to a corresponding electric signal, i.e. a fingerprint detecting signal. Data of a fingerprint image can thus be obtained based on the fingerprint detecting signal, and a further fingerprint matching verification can be performed so as to implement an optical fingerprint identification function at the terminal device 700.

It should be understood that, in a specific implementation, the terminal device 700 further includes a transparent protective cover 710; the cover 710 may be a glass cover or a sapphire cover, which is located above the display screen 720 and covers a front surface of the terminal device 700. Therefore, in the embodiments of the present application, the so-called the finger being pressed against the display screen 720 actually refers to the finger being pressed against the cover 710 above the display screen 720 or a surface of the protective layer covering the cover 710.

As an optional implementation manner, as shown in FIG. 1, the optical fingerprint apparatus 730 includes a light detecting portion 734 and an optical component 732. The light detecting portion 734 includes the sensing array, a reading circuit and other auxiliary circuits electrically connected to the sensing array, and can be fabricated on a die by a semiconductor process. The optical component 732 may be disposed above the sensing array of the optical detecting portion 734, and may specifically include a filter layer, a light directing layer and other optical elements. The filter layer may be configured to filter ambient light passing through a finger, and the light directing layer is mainly used to direct reflected light reflected from a finger surface to the sensing array for optical detection.

In a specific implementation, the optical component 732 and the light detecting portion 734 may be encapsulated in the same optical fingerprint chip. Where the light directing layer may specifically be a lens layer made of semiconductor wafer and has a plurality of lens units. The reflected light reflected from the finger is passing through the lens unit and received by the optical sensing unit under it. Therefore, the sensing array may detects a fingerprint image of the finger.

In the optical fingerprint apparatus 730, each lens unit may respectively correspond to one of optical sensing units of the sensing array. Alternatively, a one-to-one correspondence relationship may also be used between the lens units and the optical sensing units of the sensing array to reduce interference of Mohr fridge, for example, one optical sensing unit may be correspond to a plurality of lens units, or the lens units may also adopt a method of an irregular arrangement; and the lens unit adopting the irregular arrangement may correct the reflected light detected by each sensing unit through a post-software algorithm.

In some alternative implementation manners, the display screen 720 may adopt a non-self-emitting display screen, such as a liquid crystal display screen based on the backlight; in this case, the optical fingerprint apparatus 730 may fail to take the display unit of the display screen 720 as an excitation light source, therefore it requires to integrate an excitation light source inside the optical fingerprint apparatus 730 or set an outside excitation light source to implement optical fingerprint detection, where the detecting theory is consistent with the content described above.

It should be understood that, in the embodiments in the present application, the sensing array in the optical fingerprint apparatus may also be called an imaging sensor or a photoelectric sensor, which can be produced to form a DIE with a semiconductor process, wherein the DIE includes an imaging sensor.

It should also be understood that the optical fingerprint apparatus in the embodiments of the present application may also be called an optical fingerprint identification module, a fingerprint identification apparatus, a fingerprint identification module, a fingerprint module or a fingerprint collecting apparatus, etc.

To better understand the embodiments of the present application, some performance indexes are introduced first.

Field of view (Field Of View, FOV) represents a view range of a lens. In the case of the same size of the lens, a larger FOV of the lens represents that the lens can obtain information from a wider region, that is, the lens can obtain a greater amount of information.

F-number represents the amount of light that passes through the lens to the sensing array of the optical fingerprint apparatus. A smaller F-number represents a larger amount of light passing through the lens.

TV distortion represents a degree of visual distortion of an image. It can be understood that a smaller TV distortion represents a better performance of imaging.

Relative illuminance may represent a ratio of the illuminance of different points to the illuminance of a center point on the imaging plane. A smaller relative illuminance represents a more inhomogeneous illuminance of the imaging plane, which would lead to an underexposure at some points and an overexposure at the center point, and effects quality of imaging, that is, a greater relative illuminance represents better quality of imaging.

Figure 2:
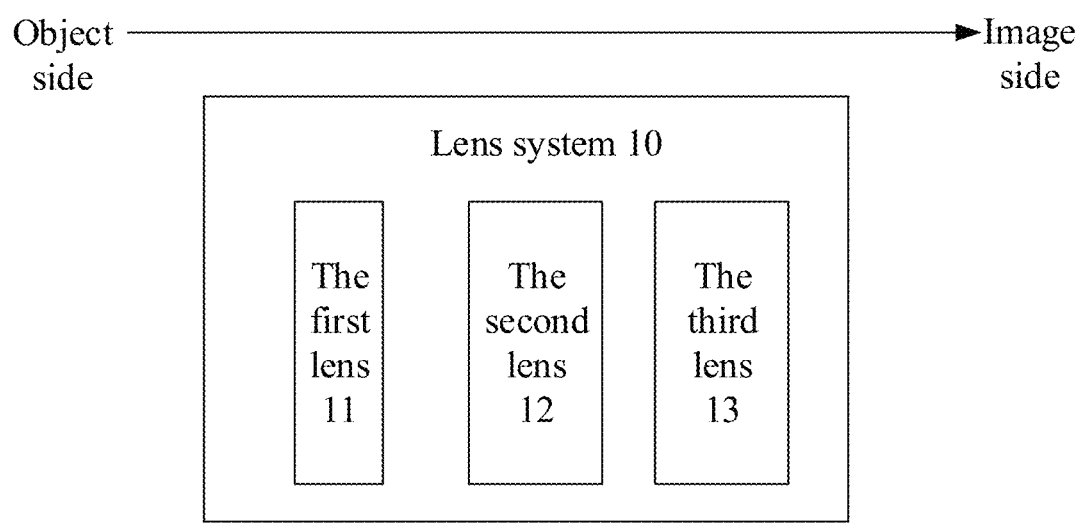
FIG. 2 is a structural schematic diagram of the lens system according to an embodiment of the present application.

FIG. 2 is a structural schematic diagram of the lens system according to an embodiments of the present application. As shown in FIG. 2, the lens system 10 includes: a first lens 11, a second lens 12 and a third lens 13 arranged sequentially from an object side to an image side, where the first lens 11 is a negative optical power lens, the second lens 12 is a positive optical power lens, and the third lens 13 is a positive optical power lens.

Specifically, the first lens is a meniscus negative optical power lens with the object side being concave (i.e., the side close to the object), the second lens is a positive optical power lens with both object side and image side being convex (i.e. the side close to the image), and the third lens is a positive optical power lens with both object side and image side being convex.

It should be understood that the concave surface or convex surface on the object side refers to convexity or convexity of surfaces of the lenses on the object side along an optical axis. Similarly, the convex surface or the concave surface on the image side refers to convexity or convexity of surfaces of the lenses on the image side along an optical axis.

That is, the first lens 11 may be a concave lens, the second lens 12 may be a convex lens and the third lens 13 may be a convex lens.

It should be understood that, in the embodiments of the present application, the first lens may be a concave lens, or also be a set of lenses, as long as a combined focal length of the set of lenses is a negative power. Likewise, the second lens may be a convex lens, or also be a set of lenses, as long as a combined focal length of the set of lenses is a positive power. Similarly, it may be the same for the third lens, and not described in detail here.

Optionally, in some embodiments, the first lens, the second lens and the third lens may be made of resin, or other plastic materials, which are not limited in the embodiments of the present application.

Further, the parameters of the lens system are set to follow a first relationship so that the FOV of the lens system is greater than a first threshold. As an example but not limitation, the parameters of the lens system include at least two of the following: a focal length of the first lens, a focal length of the second lens, a focal length of the third lens, a combined focal length of the first lens and the second lens, a combined focal length of the second lens and the third lens, and a focal length of the lens system.

For example, the first relationship followed by the parameters of the lens system may be a ratio of the focal length of the first lens to the focal length of the second lens being in a certain range, or a ratio of the combined focal length of the first lens and the second lens to the focal length of the third lens being in a certain range, or a ratio of the focal length of the first lens to the combined focal length of the second lens and the third lens being a certain range, which is not limited in the embodiments of the present application.

Optionally, in some embodiments, the first relationship may be $1.0 < f_{12}/f_3 < 2.7$, wherein $f_2$ is the combined focal length of the first lens and the second lens, and $f_3$ is the focal length of the third lens.

That is to say, in the embodiments of the present application, the ratio of the combined focal length of the first lens and the second lens to the focal length of the third lens can be set to be in a certain range so that the lens system achieves a performance of a large FOV. Thus, the fingerprint identification module of the lens system can collect fingerprint information in a wide range, thereby improving accuracy and security of fingerprint identification.

Optionally, in some possible implementation manners, the first threshold is 120 degrees.

Therefore, the parameters of the lens system can be set to follow the first relationship so that the FOV of the lens system is greater than 120 degrees. Thus, under the condition of sizes of the lenses being the same, the fingerprint information in a wider range can be collected, which is in favor of improving the resolving power of the fingerprint identification.

Optionally, in some embodiments, the F-number of the lens system is less than 1.6, then there will be enough light allowed to pass through the lens system, which is in favor of collecting weak fingerprint signals, and reduce the exposure time and power can be reduced at the same time.

Optionally, in some embodiments, the TV distortion of the lens system is less than 5%, which is in favor of avoiding the effect of Mohr fringe on image formation of a fingerprint.

Optionally, in some embodiments, the relative illuminance of the lens system is greater than 30%, which is in favor of improving quality of imaging.

Therefore, in the lens system according to the embodiments of the present application, the lenses of different optical power are arranged and parameters are configured to follow the first relationship, then the lens system is enabled with a large FOV, a small F-number, a small TV distortion and a large relative illuminance, thereby improving the fingerprint identification performance of the optical fingerprint identification module which adopts the lens system.

Optionally, in some embodiments, a largest image height Y' on an imaging plane, the focal length f, and a distance (i.e., a total track length) from a lower surface of a display screen to the imaging plane of the lens system TTL follow a second relationship so that the focal length of the lens system is less than a second threshold.

It should be understood that, the TTL determines the focal length of the lens system, or, the size of the lens system. In the embodiments of the present application Y', f and TTL can be set to follow the second relationship, so that the lens system can not only has a larger FOV but also has a shorter focal length, thus the lens system can be better applicable to those terminal devices that have specific requirements on size.

It may be understood that the display screen may be a display screen of an electronic device with the lens system installed, the imaging plane may be a surface of the imaging sensor, which may be corresponding to the DIE in the optical fingerprint identification module, i.e. the portion which detects an optical signal.

Optionally, in some embodiments, the second relationship is $0.4<Y'/(f*TTL)<0.5$.

Optionally, the second threshold may be 5 millimeters or 3 millimeters, etc., which is not limited in the embodiments of the present application, as long as matches the requirements of the size of the terminal device.

Optionally, in some embodiments, the lens system further includes a diaphragm, arranged between the second lens and the third lens.

Specifically, the diaphragm may be configured to regulate the range of the optical signal and the range of imaging, so that the optical signal with fingerprint information can maximally imaging on the surface of the imaging sensor in the optical fingerprint identification module, thereby making the imaging sensor obtain more fingerprint information and enhancing the resolving power of the fingerprint identification.

In conclusion, the lens system in the embodiments of the present application is a wide-angle short focal length lens. The design of the wide angle enables the lens system to collect fingerprint information in a wider range, and the design of the short focal length enables the lens system to occupy a relatively small space. Therefore, the lens system may not only implement better performance of fingerprint identification but meet the requirements on size of the terminal device, thereby improving applicability of the lens system.

Optionally, in some embodiments, physical parameters such as radius of curvature, thickness, material, effective diameter and conic coefficient of each structural part (for example, the first lens, the second lens, the diaphragm, and the third lens) of the lens system, and/or an aspherical high order items coefficient (for example, even order terms of A2-A16) of an aspherical lens of the lens system, so that the parameters of the lens system follow the first relationship and the second relationship, thereby making the FOV greater than 120 degrees, TV distortion less than 5%, F number less than 1.5, and the relative illuminance greater than 30%, in the lens system.

It should be understood that the lens system in the embodiments of the present application may be applied to the optical fingerprint identification module, where the lens system may be combined with the image sensor of the optical fingerprint identification module to implement imaging in a wider range in a limited space; or, the lens system may also be applied to other apparatuses or devices that requires higher performance in optical imaging, which are not limited in the embodiments of the present application.

Figure 3:
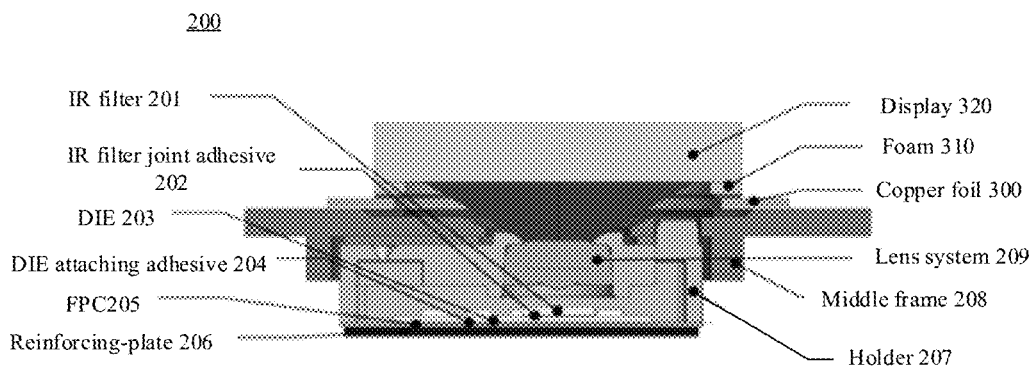
FIG. 3 is a structural schematic diagram of the optical fingerprint identification module according to an embodiment of the present application.

FIG. 3 is a schematic structural diagram of an optical fingerprint identification module according to embodiments of the present application. As shown in FIG. 3, the optical fingerprint identification module 200 may include: an infrared filter (Infrared filter, IR Filter) 201, an IR filter attaching adhesive 202, a DIE 203, a DIE attaching adhesive 204, a flexible printed circuit (FPC) 205, a reinforcing-plate 206, a holder 207 and a lens system 209.

Where the IR filter is configured to filter infrared to avoid effect of infrared on fingerprint imaging;

the IR filter attaching adhesive 202 is configured to adhere the IR filter 201 to DIE 203;

the DIE 203, corresponding to the light detector portion 734 in FIG. 1, is configured to transform an optical signal to an electrical signal, and can be combined with the lens system 209 to transform the optical signal imaged by the lens system 209 to the electrical signal;

the DIE attaching adhesive 204, is configured to fix the DIE 203 with the flexible printed circuit (FPC) 205;

the FPC 205, is configured to connect the DIE 203 and a circuit in the electronic apparatus installed in the optical fingerprint identification module; and the holder 207, is configured to fix the lens system 209 with the DIE 203 so as to control the accuracy of defocus and eccentricity.

There is also a display module disposed on the optical fingerprint identification module 200, including a display screen 320, foam 310 and copper foil 300.

In the embodiments of the present application, the lens system 209 may be assembled in the holder 207 with an interference fit so that the lens system 209 can be adhesive to the DIE 203. Therefore every structure of the optical fingerprint identification module can be adhesive to one another, thereby fixing the optical fingerprint identification module to a middle frame 208 of the electronic apparatus.

Since there is optical signal transmission between the lens system 209 and the display screen 320, an opening is needed in the foam 310 and the copper foil 300 in the display module corresponding to the lens system 209 so that the optical signal within the range of FOV of the lens system 209 can pass.

Now, detailed description of the performance of the lens system in embodiments of the present application is given with reference to embodiment 1 to embodiment 3.

Figure 4:
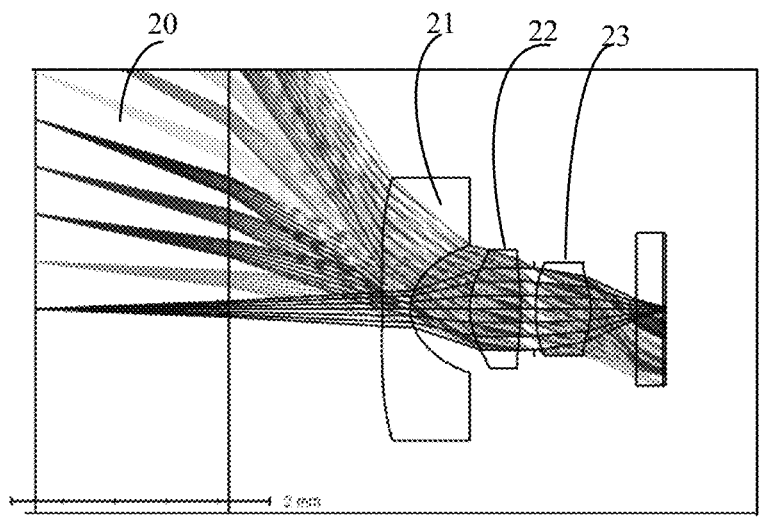
FIG. 4 is a diagram schematic of a layout of the lens system according to an embodiment of the present application.
Figure 5:
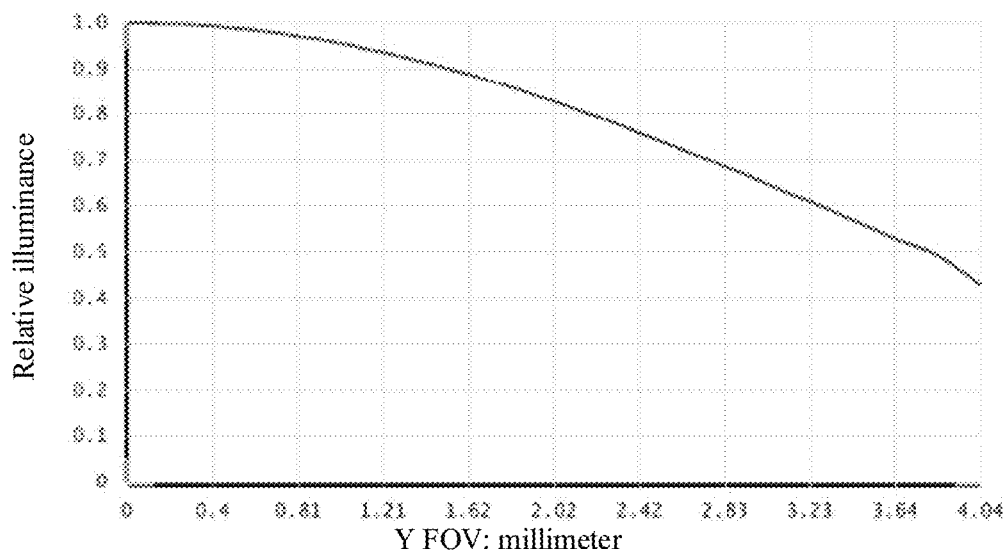
FIG. 5 is a diagram of relative illuminance of the lens system with the layout as shown in FIG. 4.
Figure 6:
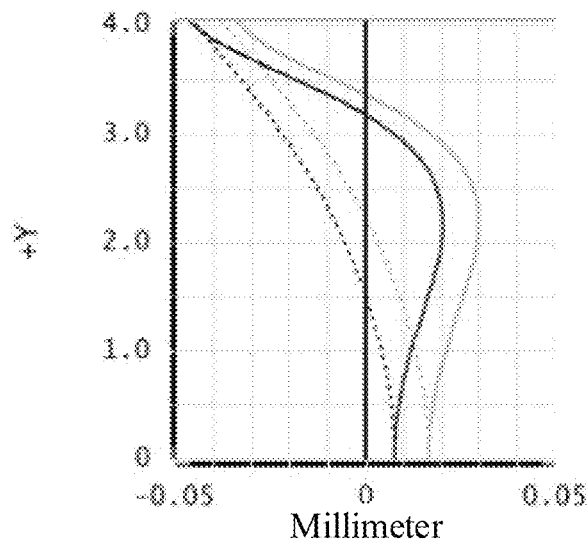
FIG. 6 is a diagram of astigmatism of the lens system with the layout as shown in FIG. 4.
Figure 7:
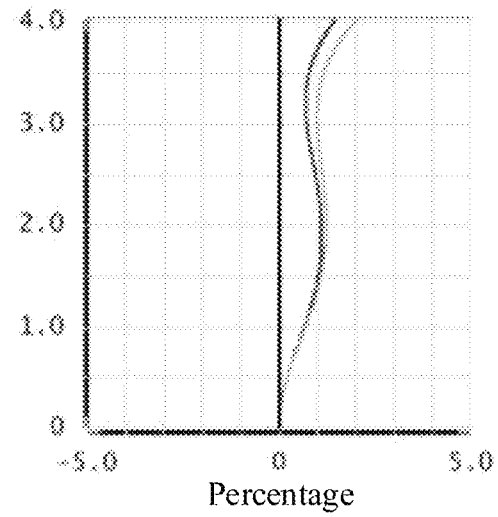
FIG. 7 is a diagram of TV distortion of the lens system with the layout as shown in FIG. 4.
Figure 8:
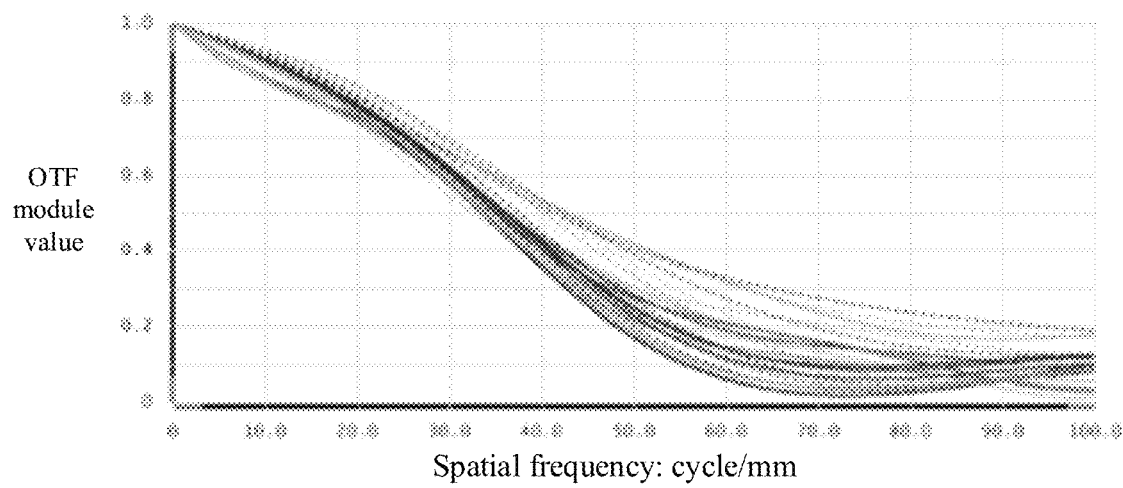
FIG. 8 is a diagram of MTF of the lens system with the layout as shown in FIG. 4.
Figure 9:
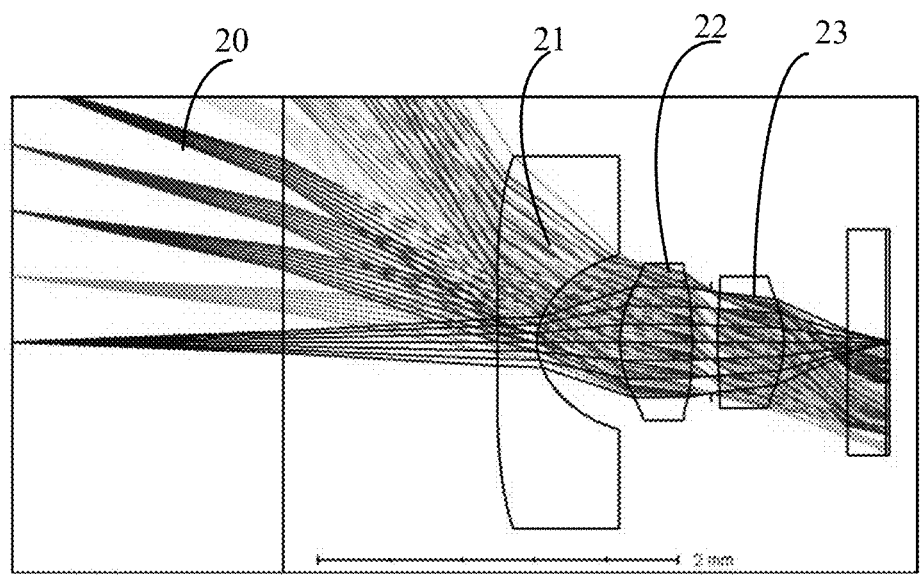
FIG. 9 is a schematic diagram of another layout of the lens system according to an embodiment of the present application.
Figure 10:
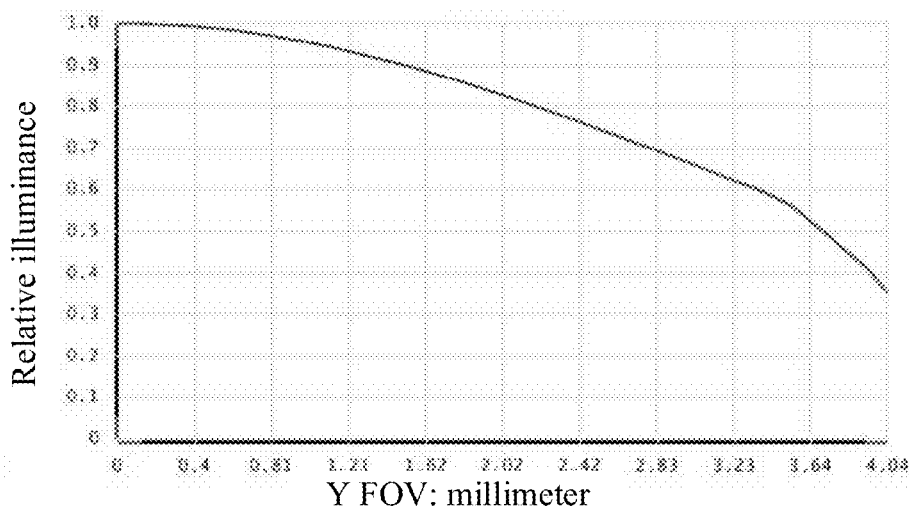
FIG. 10 is a diagram of relative illuminance of the lens system with the layout as shown in FIG. 9.
Figure 11:
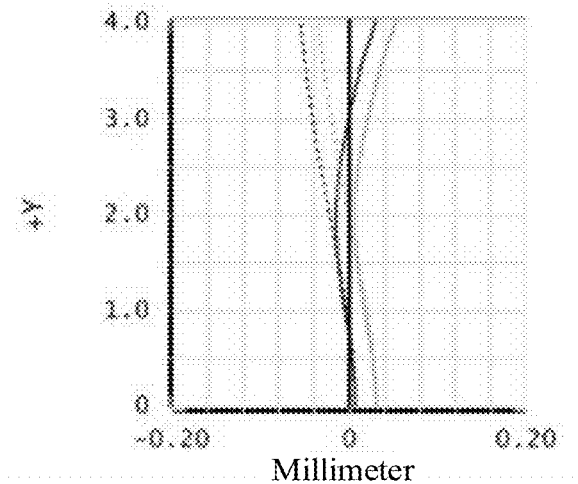
FIG. 11 is a diagram of astigmatism of the lens system with the layout as shown in FIG. 9.
Figure 12:
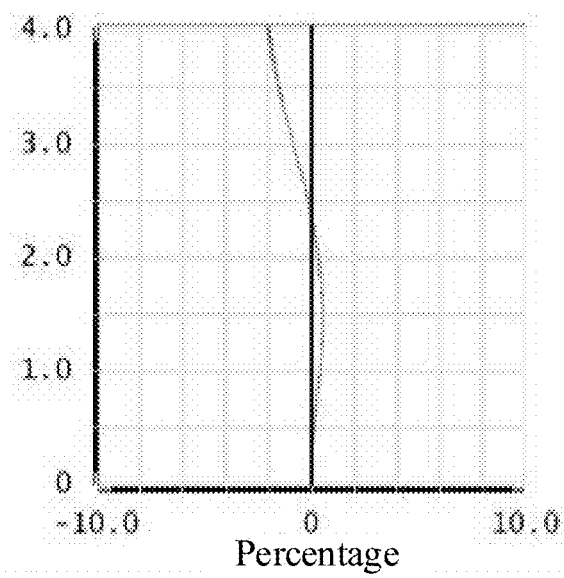
FIG. 12 is a diagram of TV distortion of the lens system layout with the as shown in FIG. 9.
Figure 13:
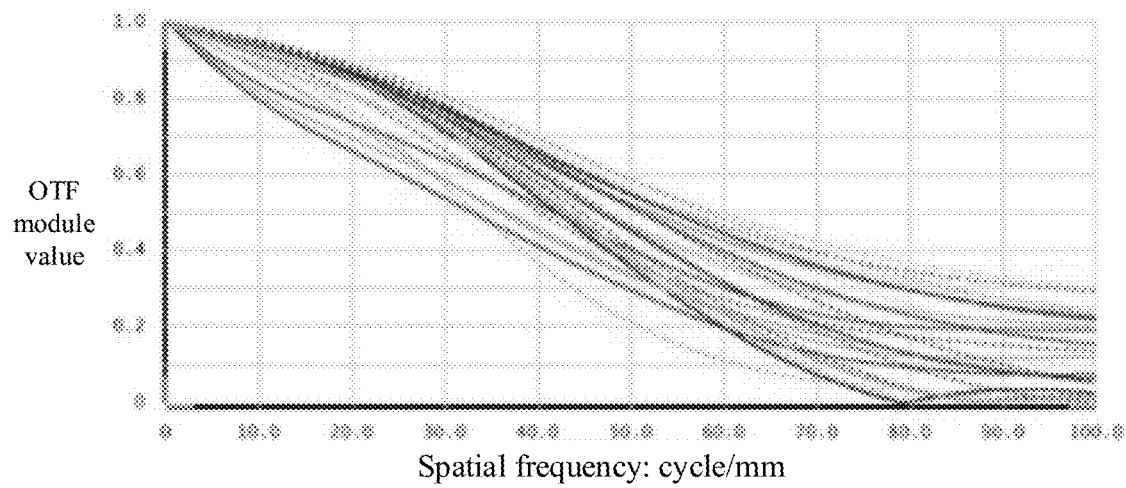
FIG. 13 is a diagram of MTF of the lens system with the layout as shown in FIG. 9.
Figure 14:
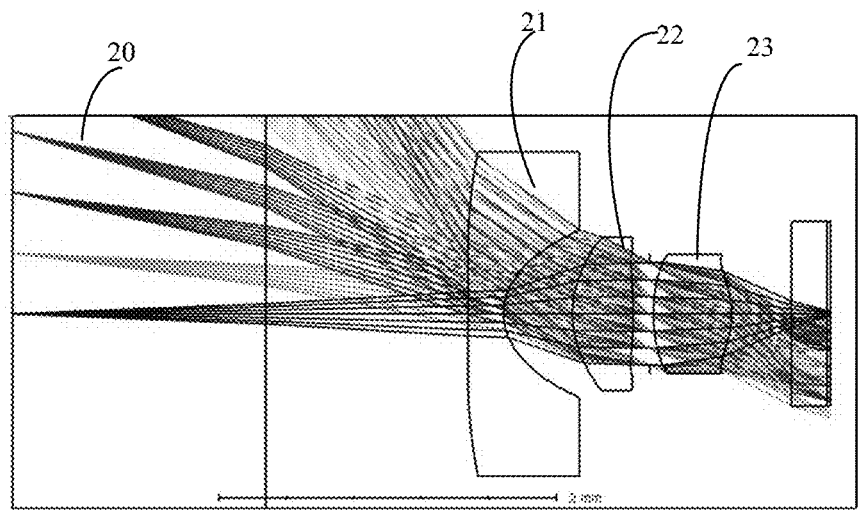
FIG. 14 is a schematic diagram of another layout of the lens system according to an embodiments of the present application.
Figure 15:
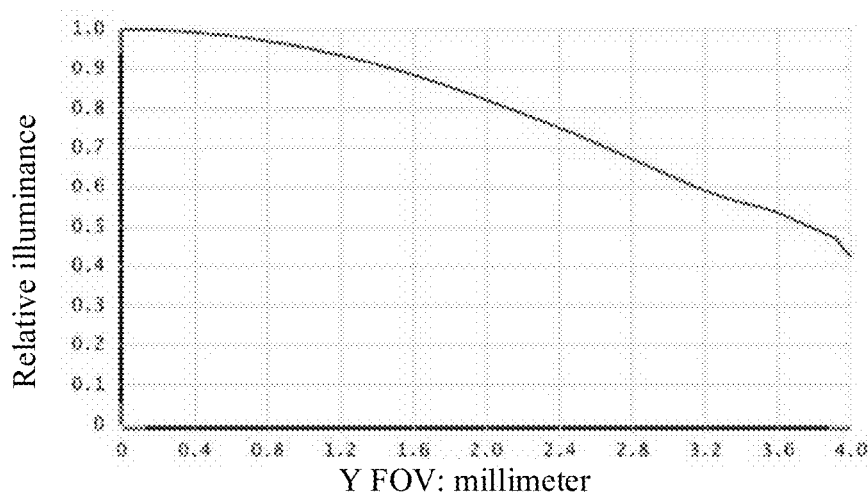
FIG. 15 is a diagram of relative illuminance of the lens system with the layout as shown in FIG. 14.
Figure 16:
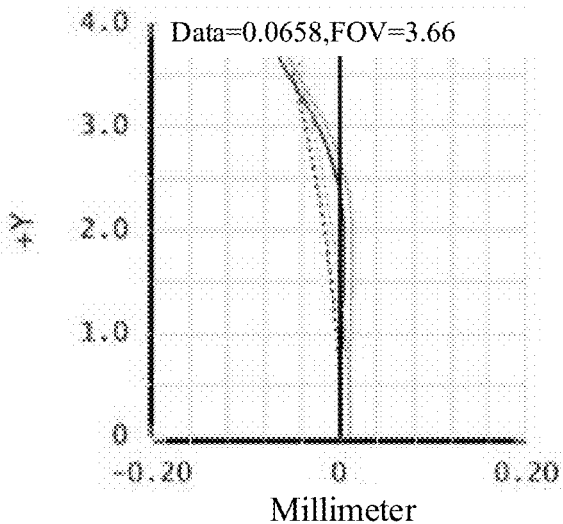
FIG. 16 is a diagram of astigmatism of the lens system with the layout as shown in FIG. 14.
Figure 17:
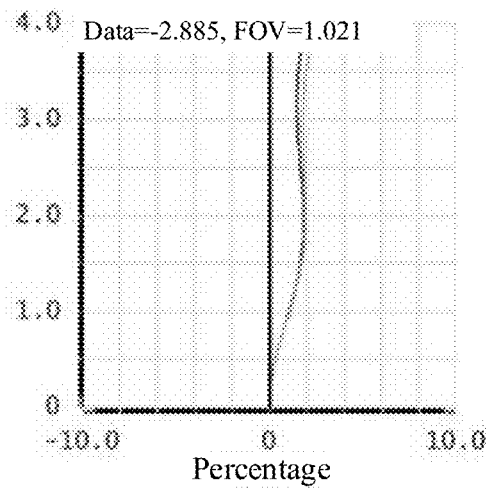
FIG. 17 is a diagram of TV distortion of the lens system with the layout as shown in FIG. 14.
Figure 18:
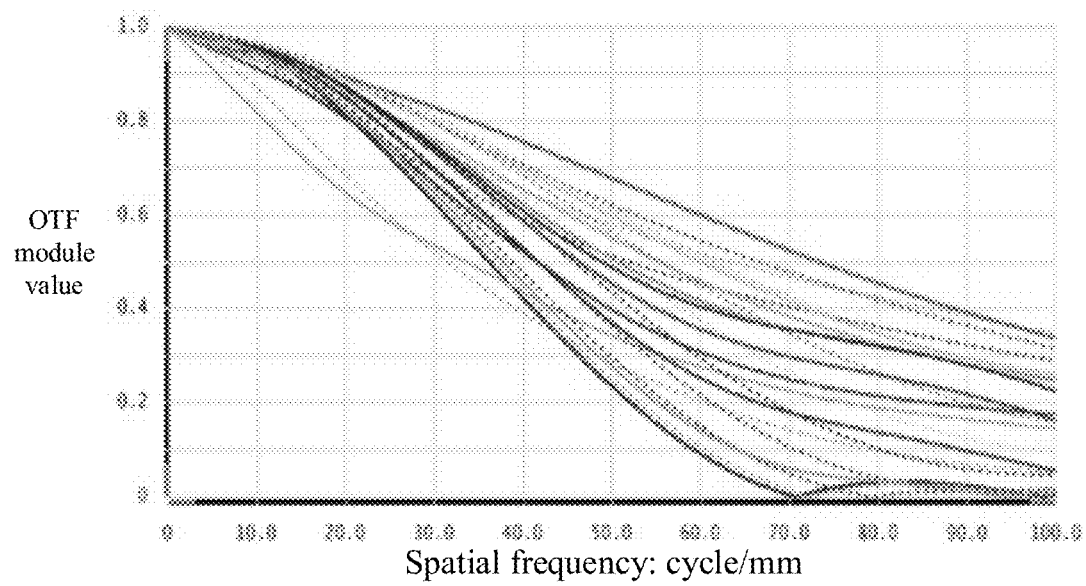
FIG. 18 is a diagram of MTF of the lens system with the layout as shown in FIG. 14.

From the embodiment 1 to the embodiment 3, the lens system includes three sets of the lens and a diaphragm. FIG. 4, FIG. 9 and FIG. 14 show three layouts of the lens system in the embodiment 1 to the embodiment 3, respectively, in which there are a display screen 20, a first lens 21, a second lens 22, a diaphragm, a third lens 23, an IR filter and filter attaching adhesive, arranged sequentially from the object side to the image side.

Where the first lens 21, the second lens 22 and the third lens 23 are respectively corresponding to the first lens 11, the second lens 12 and the third lens 13 mentioned above, that is, the first lens 21 is a concave lens, the second lens 22 is a convex lens and the third lens 23 is a convex lens.

In the convenience of distinguishing and description, according to the order from the object side to the image side, the upper surface and the lower surface of the display screen 20 are marked as S1 and S2 respectively, two surfaces of the first lens 21 are marked as S3 and S4, two surfaces of the second lens 22 are marked as S5 and S6, the surface of the diaphragm of are marked as S7, two surfaces of the third lens 23 are marked as S8 and S9, surfaces of the IR filter are marked as S10 and S11 respectively, surfaces of the filter attaching adhesive are marked as S12 and S13, and the imaging plane is S14.

Further, by setting at least one of radius of curvature, thickness, material, effective diameter and conic coefficient of each surface of the lens system, and/or an aspherical high order terms coefficient of an aspherical lens in the lens system, including A2, A4, A6, A8, A10, A12, A14, A16, so that the parameters of the lens system follow the first relationship and the second relationship, thereby making the FOV greater than 120 degrees, the TV distortion less than 5%, the F-number less than 1.5, and the relative illuminance greater than 30%, in the lens system.

Herein after, the first relationship is $1.0<f_2/f_3<2.7$ and the second relationship is $0.4<Y'/(f*TTL)<0.5$, which are described as examples but to which the present application is not limited.

In embodiment 1, radius of curvature, thickness, material, effective diameter, conic coefficient of each surface in S1-S14 can be set to adopt corresponding parameters in Table 1, where the aspherical high order terms coefficient of the aspherical surfaces in S1-S14 adopts the parameters as shown in Table 2.

TABLE 1

| Surface | Type of Surface | Radius of curvature | Thickness | Material | Effective diameter | Conic coefficient |
|---|---|---|---|---|---|---|
| S1 | Object surface | Infinite | 1.5 | BK7 | 4.040 | |
| S2 | Spherical surface | Infinite | 1.185 | | 3.034 | |
| S3 | Aspherical surface | −18.229 | 0.218 | APL5014CL | 1.007 | 302.838 |
| S4 | Aspherical surface | 0.337 | 0.462 | | 0.489 | −1.467 |
| S5 | Aspherical surface | 0.562 | 0.393 | APL5014CL | 0.452 | −0.599 |
| S6 | Aspherical surface | −1.698 | 0.104 | | 0.384 | −351.774 |
| S7 | Diaphragm surface | Infinite | 0.012 | | 0.310 | |
| S8 | Aspherical surface | 1.063 | 0.427 | APL5014CL | 0.342 | −2.541 |
| S9 | Aspherical surface | −0.566 | 0.352 | | 0.358 | −7.073 |
| S10 | Spherical surface | Infinite | 0.21 | D263TECO | 0.475 | |
| S11 | Spherical surface | Infinite | 0.020 | BK7 | 0.576 | |
| S14 | Imaging surface | | | | 0.587 | |

It should be understood that, blank spaces in Table 1 to Table 6 in the embodiments of the present application indicate no parameter, for example, the blank space in the material may indicate air. The parameters of S12 and S13 are not shown. S11 and S12 are the same surface, and S13 and S14 are the same surface, therefore the parameters of S12 and S13 are not given.

TABLE 2

| Surface | A2 | A4 | A6 | A8 | A10 | A12 | A14 | A16 |
|---|---|---|---|---|---|---|---|---|
| S3 | | 0.186 | −0.115 | 0.017 | 0.072 | 0.018 | −0.141 | 0.084 |
| S4 | | 1.842 | 2.028 | 4.720 | 15.322 | −39.819 | 80.660 | 806.794 |
| S5 | | −0.467 | −0.953 | −17.523 | 20.146 | 41.789 | 612.681 | −1558.96 |
| S6 | | −1.775 | 14.465 | 0.202 | −781.236 | −1275.87 | 6.396e4 | −2.171e5 |
| S8 | | −0.412 | 13.089 | −10.739 | 213.890 | −4802.74 | 1.760e4 | 1.118e4 |
| S9 | | −1.718 | 28.238 | −27.843 | −230.463 | −2210.54 | 7.108e4 | −2.641e5 |

Based on the parameters shown in Table 1 and Table 2, it can be determined that the parameters of the lens system in the embodiment 1 are as follows: TTL=3.38 (i.e., the distance from S2 to S14), $f_1=-0.601758$, $f_2=0.822380$, $f_3=0.743935$, $f_{12}=1.590600$, $f=0.367239$, $f_{12}/f_3=2.13809$, that is, the parameters of the lens system follow the first relationship and second relationship mentioned above. Under the above parameters, FIGS. 5-8 are sequentially diagram of relative illuminance, diagram of astigmatism, diagram of TV distortion and diagram of module value (MTF) of optical transfer function (Optical Transfer Function).

From simulation diagrams as shown in FIGS. 5-8, in the lens system, the FOV is 124 degrees, the F-number is 1.223, the TV distortion is −2.028% and the relative illuminance is 41.0%. Thus, with the lens system following the above-mentioned first relationship and second relationship, the lens system has large FOV, small F-number, small TV distortion and high relative illuminance.

In the embodiment 2, radius of curvature, thickness, material, effective diameter, conic coefficient of each surface from S1-S14 can be set to adopt corresponding parameters in Table 3, where the aspherical high order terms coefficient of the aspherical surfaces in S1-S14 adopts the parameters as shown in Table 4.

TABLE 3

| Surface | Type of Surface | Radius of curvature | Thickness | Material | Effective diameter | Conic coefficient |
| --- | --- | --- | --- | --- | --- | --- |
| S1  | Object surface     | Infinite | 1.5   | BK7      | 4.04  |          |
| S2  | Spherical surface  | Infinite | 1.191 |          | 3.043 |          |
| S3  | Aspherical surface | −18.230  | 0.218 |          | 1.029 | 300.767  |
| S4  | Aspherical surface | 0.341    | 0.461 |          | 0.484 | −1.481   |
| S5  | Aspherical surface | 0.341    | 0.461 |          | 0.433 | −0.588   |
| S6  | Aspherical surface | 0.569    | 0.400 |          |       | −421.586 |
| S7  | Diaphragm surface  | Infinite | 0.036 |          | 0.282 |          |
| S8  | Aspherical surface | 1.743    | 0.370 | APL5014CL| 0.302 | −2.127   |
| S9  | Aspherical surface | −0.571   | 0.355 |          | 0.364 | −4.503   |
| S10 | Spherical surface  | Infinite | 0.21  | D263TECO | 0.511 |          |
| S11 | Spherical surface  | Infinite | 0.02  | BK7      | 0.613 |          |
| S14 | Imaging surface    |          |       |          | 0.624 |          |

TABLE 4

| Surface | A2 | A4 | A6 | A8 | A10 | A12 | A14 | A16 |
| --- | --- | --- | --- | --- | --- | --- | --- | --- |
| S3 |   | 0.185  | −0.116  | 0.015    | 0.072    | 0.019    | −0.140   | 0.085    |
| S4 |   | 1.736  | 2.063   | 5.227    | 19.324   | −13.532  | 226.239  | 1463.033 |
| S5 |   | −0.458 | −0.913  | −17.906  | 12.240   | −22.420  | 301.434  | −2517.25 |
| S6 |   | −1.995 | 11.807  | −13.286  | −820.210 | −1255.51 | 6.513e4  | −2.086e5 |
| S8 |   | −0.660 | −13.691 | −101.157 | 1098.053 | 1.631e4  | −727.929 | −1.150e6 |
| S9 |   | −2.785 | 34.032  | −77.283  | −294.196 | −1411.69 | 4248.241 | 1.322e5  |

Based on the parameters shown in Table 3 and Table 4, it can be determined that the parameters of the lens system in the embodiment 1 are as follows: TTL=3.36613 (i.e., the distance from S2 to S14), $f_1$=−0.608717, $f_2$=0.727880, $f_3$=0.832835, $f_{12}$=1.105138, f=0.39179, $f_{12}/f_3$=1.327, Y'/(f*TTL)=0.451, that is, the parameters of the lens system follow the first relationship and second relationship mentioned above. Under the above parameters, FIGS. 10-13 are sequentially diagram of relative illuminance, diagram of astigmatism, diagram of TV distortion and diagram of MTF.

From simulation diagrams as shown in FIGS. 10-13, in the lens system, the FOV is 123 degrees, the F-number is 1.247, the TV distortion is −2.102% and the relative illuminance is 34.6%. Thus, with the lens system following the above-mentioned first relationship and second relationship, the lens system has large FOV, small F-number, small TV distortion and high relative illuminance.

In the embodiment 3, radius of curvature, thickness, material, effective diameter, conic coefficient of each surface in S1-S14 can be set to adopt corresponding parameters in Table 5, wherein the aspherical high order terms coefficient of the aspherical surfaces in S1-S14 adopts parameters as shown in Table 6.

TABLE 5

| Surface | Type of Surface | Radius of curvature | Thickness | Material | Effective diameter | Conic coefficient |
| --- | --- | --- | --- | --- | --- | --- |
| S1  | Object surface     | Infinite | 1.5   | BK7       | 4.00  |          |
| S2  | Spherical surface  | Infinite | 1.3   |           | 3.019 |          |
| S3  | Aspherical surface | −19.863  | 0.210 | APL5014CL | 0.971 | 404.468  |
| S4  | Aspherical surface | 0.327    | 0.408 |           | 0.507 | −1.663   |
| S5  | Aspherical surface | 0.571    | 0.361 | APL5014CL | 0.465 | −0.639   |
| S6  | Aspherical surface | −1.531   | 0.097 |           | 0.370 | −274.759 |
| S7  | Diaphragm surface  | Infinite | 0.023 |           | 0.305 |          |
| S8  | Aspherical surface | 1.056    | 0.462 | APL5014CL | 0.355 | 2.010    |
| S9  | Aspherical surface | −0.529   | 0.356 |           | 0.347 | −6.033   |
| S10 | Spherical surface  | Infinite | 0.21  | D263TECO  | 0.426 |          |
| S11 | Spherical surface  | Infinite | 0.02  | BK7       | 0.528 |          |
| S14 | Imaging surface    |          |       |           | 0.540 |          |

TABLE 6

| Surface | A2 | A4 | A6 | A8 | A10 | A12 | A14 | A16 |
|---|---|---|---|---|---|---|---|---|
| S3 | | 0.174 | −0.096 | 0.013 | 0.049 | 3.276e−3 | −0.140 | 0.110 |
| S4 | | 2.128 | 1.912 | 0.685 | −2.957 | −26.139 | 143.791 | −678.914 |
| S5 | | −0.783 | 0.812 | −9.438 | 48.170 | 75.200 | 143.152 | −385.979 |
| S6 | | −1.196 | 14.044 | 23.499 | −928.722 | −350.306 | 6.612e4 | −1.853e5 |
| S8 | | 0.073 | 9.744 | −23.095 | 57.055 | −323.067 | 600.961 | 2.541e4 |
| S9 | | −2.117 | 24.670 | 35.827 | −108.577 | −991.275 | 932.978 | 1.799e5 |

Based on the parameters shown in Table 5 and Table 6, it can be determined that the parameters of the lens system in embodiment 3 are as follows: $f_1 = -0.584991$, $f_2 = 0.808783$, $f_3 = 0.717745$, $f_{12} = 1.861261$, $f = 0.373529$, $f_{12}/f_3 = 2.593$, $Y'/(f*TTL) = 0.444$, that is, the parameters of the lens system follow the first relationship and second relationship mentioned above. With reference to above-mentioned parameters, FIGS. 15-18 are sequentially diagram of relative illuminance, diagram of astigmatism, diagram of TV distortion and diagram of MTF.

From simulation diagrams as shown in FIGS. 15-18, in the lens system, the FOV is 120 degrees, the F-number is 1.240, the TV distortion is 1.755% and the relative illuminance is 45.8%. Thus, with the lens system following the above-mentioned first relationship and second relationship, the lens system has large FOV, small F-number, small TV distortion and high relative illuminance.

In conclusion, the lens system in the embodiments of the present application provides a wide-angle short focal length lens. The lens system can implement collecting fingerprint information of a wider range, and the design of the short focal length enables the lens system to better apply to the terminal device with specific requirements on size, which improve the applicability of the lens system.

Figure 19:
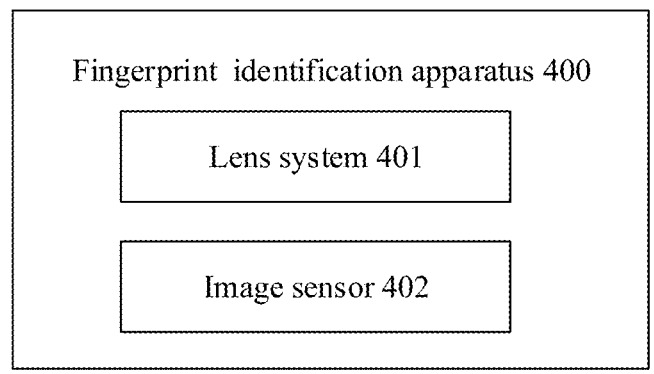
FIG. 19 is a schematic structural diagram of the fingerprint identification apparatus according to an embodiment of the present application.

FIG. 19 is a schematic structural diagram of the fingerprint identification apparatus according to embodiments of the present application. As shown in FIG. 19, the fingerprint identification apparatus 400 may include a lens system 401, and the lens system 401 may be the lens system 10 in above-mentioned embodiment.

Optionally, the fingerprint identification apparatus may include an image sensor 402, disposed under the lens system 401, is configured to receive an optical signal transmitted by the lens system, and process the optical signal so as to obtain fingerprint information from the optical signal.

Optionally, the fingerprint identification apparatus 400, corresponding to the optical fingerprint identification module 200 shown in FIG. 3, may also include the structure in the optical fingerprint identification module 200, for example, the IR filter 201 and the holder 207 etc., which are not described in detail here.

Figure 20:
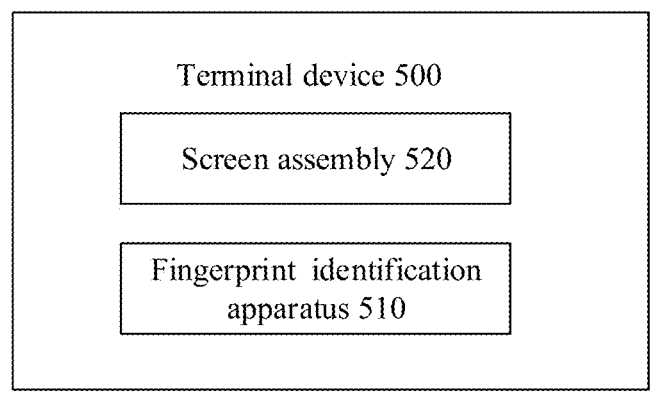
FIG. 20 is a schematic block diagram of the terminal device according to an embodiment of the present application.

A terminal device is also provided in an embodiment of the present application, as shown in FIG. 20, the terminal device 500 includes a fingerprint identification apparatus 510, which may be the fingerprint identification apparatus 400 in above-mentioned embodiment, or the optical fingerprint identification module 200 shown in FIG. 3.

Optionally, the terminal device may further include a screen assembly 520, where the screen assembly 520 includes a display, a foam and a copper foil, which are disposed above the lens system of the fingerprint identification apparatus 510; where a corresponding area above the lens system in the foam and the copper foil is opened, so that the optical signal with the fingerprint information enters the lens system.

By way of example but not limitation, the terminal device 500 may be cellphones, tablet computers, desk computers, in-vehicle electronic devices and wearable smart devices etc. The wearable intelligent device includes a device, such as a smart watch or smart glasses, that is of a full function and a large size and that can implement all or some functions without relying on a smartphone, and a device, such as a smart band or smart jewelry that performs sign monitoring, that is dedicated to only one type of application function and that needs to be used together with another device such as a smartphone.

It should be understood that the specific examples in the embodiments of the present application are only to help those skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application.

What is claimed is:

1. A lens system, comprising: a first lens, a second lens and a third lens arranged sequentially from an object side to an image side, wherein the first lens is a meniscus negative optical power lens with the object side being concave, the second lens is a positive optical power lens with both object side and image side being convex, and the third lens is a positive optical power lens with both object side and image side being convex; and parameters of the lens system follow a first relationship so that a field of view (FOV) of the lens system is greater than a first threshold, wherein the parameters of the lens system include at least two of the following: a focal length of the first lens, a focal length of the second lens, a focal length of the third lens, a combined focal length of the first lens and the second lens, a combined focal length of the second lens and the third lens, and a focal length of the lens system, wherein the first relationship is $1.0 < f_{12}/f_3 < 2.7$, the $f_{12}$ is the combined focal length of the first lens and the second lens, and $f_3$ is the focal length of the third lens.

2. The lens system according to claim 1, wherein the first threshold is 120 degrees.

3. The lens system according to claim 1, wherein a largest image height Y' on an imaging plane of the lens system, a focal length f, and a distance from a lower surface of a display screen to the imaging plane of a lens system (TTL) follow a second relationship so that the focal length of the lens system is less than a second threshold.

4. The lens system according to claim 3, wherein the second relationship is 0.4<Y'/(f*TTL)<0.5.

5. The lens system according to claim 1, wherein the lens system further comprises:
 a diaphragm, arranged between the second lens and the third lens.

6. The lens system according to claim 1, wherein at least one surface in the lens system is an aspherical surface.

7. The lens system according to claim 1, wherein a TV distortion of the lens system is less than 5%, a relative illuminance of the lens system is greater than 30%, and an F-number of the lens system is less than 1.5.

8. A fingerprint identification apparatus, comprising: a lens system; wherein the lens system comprises: a first lens, a second lens and a third lens arranged sequentially from an object side to an image side, wherein the first lens is a meniscus negative optical power lens with the object side being concave, the second lens is a positive optical power lens with both object side and image side being convex, and the third lens is a positive optical power lens with both object side and image side being convex; and
 parameters of the lens system follow a first relationship so that a field of view (FOV) of the lens system is greater than a first threshold, wherein the parameters of the lens system include at least two of the following: a focal length of the first lens, a focal length of the second lens, a focal length of the third lens, a combined focal length of the first lens and the second lens, a combined focal length of the second lens and the third lens, and a focal length of the lens system, wherein the first relationship is $1.0<f_{12}/f_3<2.7$, the $f_{12}$ is the combined focal length of the first lens and the second lens, and $f_3$ is the focal length of the third lens.

9. The fingerprint identification apparatus according to claim 8, wherein a largest image height Y' on an imaging plane of the lens system, a focal length f, and a distance from a lower surface of a display screen to the imaging plane of a lens system (TTL) follow a second relationship so that the focal length of the lens system is less than a second threshold.

10. The fingerprint identification apparatus according to claim 8, wherein the second relationship is 0.4<Y'/(f*TTL)<0.5.

11. The fingerprint identification apparatus according to claim 8, wherein a TV distortion of the lens system is less than 5%, a relative illuminance of the lens system is greater than 30%, and an F-number of the lens system is less than 1.5.

12. The fingerprint identification apparatus according to claim 8, wherein the fingerprint identification apparatus further comprises:
 an imaging sensor, disposed under the lens system, configured to receive an optical signal transmitted by the lens system, and process the optical signal so as to obtain fingerprint information in the optical signal.

13. The fingerprint identification apparatus according to claim 8, further comprising: a holder,
 wherein the lens system is assembled in the holder with an interference fit.

14. A terminal device, comprising: a fingerprint identification apparatus, wherein the fingerprint identification apparatus comprises a lens system; wherein the lens system comprises: a first lens, a second lens and a third lens arranged sequentially from an object side to an image side, wherein the first lens is a meniscus negative optical power lens with the object side being concave, the second lens is a positive optical power lens with both object side and image side being convex, and the third lens is a positive optical power lens with both object side and image side being convex; and
 parameters of the lens system follow a first relationship so that a field of view (FOV) of the lens system is greater than a first threshold, wherein the parameters of the lens system include at least two of the following: a focal length of the first lens, a focal length of the second lens, a focal length of the third lens, a combined focal length of the first lens and the second lens, a combined focal length of the second lens and the third lens, and a focal length of the lens system, wherein the first relationship is $1.0<f_{12}/f_3<2.7$, the $f_{12}$ is the combined focal length of the first lens and the second lens, and $f_3$ is the focal length of the third lens.

15. The terminal device according to claim 14, wherein the terminal device further comprises:
 a screen assembly, wherein includes a display screen, a foam and a copper foil, which are disposed on the fingerprint identification apparatus of the lens system;
 wherein a corresponding area above the lens system in the foam and the copper foil is opened so that an optical signal with fingerprint information enters the lens system.

* * * * *